(12) United States Patent
Wilson et al.

(10) Patent No.: US 9,753,937 B2
(45) Date of Patent: Sep. 5, 2017

(54) FILE AWARE BLOCK LEVEL DEDUPLICATION

(71) Applicant: Quest Software Inc., Aliso Viejo, CA (US)

(72) Inventors: Micah Wilson, Los Altos, CA (US); Parthiban Munusamy, Fremont, CA (US); Carter George, Portland, OR (US); Murali Bashyam, Fremont, CA (US); Vinod Jayaraman, San Francisco, CA (US); Goutham Rao, San Jose, CA (US)

(73) Assignee: QUEST SOFTWARE INC., Aliso Viejo, CA (US)

( * ) Notice: Subject to any disclaimer, the term of this patent is extended or adjusted under 35 U.S.C. 154(b) by 0 days.

(21) Appl. No.: 13/937,150

(22) Filed: Jul. 8, 2013

(65) Prior Publication Data

US 2013/0297572 A1 Nov. 7, 2013

Related U.S. Application Data

(63) Continuation of application No. 12/858,258, filed on Aug. 17, 2010, now Pat. No. 8,510,275.

(60) Provisional application No. 61/244,398, filed on Sep. 21, 2009.

(51) Int. Cl.
*G06F 17/00* (2006.01)
*G06F 17/30* (2006.01)
*G06F 17/22* (2006.01)
*G06F 11/14* (2006.01)

(52) U.S. Cl.
CPC .... *G06F 17/30156* (2013.01); *G06F 11/1446* (2013.01); *G06F 17/2247* (2013.01); *G06F 17/30067* (2013.01); *G06F 17/30575* (2013.01)

(58) Field of Classification Search
None
See application file for complete search history.

(56) References Cited

U.S. PATENT DOCUMENTS

| 6,134,597 A * | 10/2000 | Rieth | H04L 63/0807 709/217 |
| 6,604,106 B1 * | 8/2003 | Bodin | G06F 17/30067 |
| 7,733,247 B1 | 6/2010 | He et al. | |

(Continued)

OTHER PUBLICATIONS

"Achieving Storage Efficiency with Data Deduplication", Dell NX4, Dell Inc., 2008, 17 pgs.

(Continued)

*Primary Examiner* — Hung Le
(74) *Attorney, Agent, or Firm* — Maschoff Brennan

(57) ABSTRACT

A system provides file aware block level deduplication in a system having multiple clients connected to a storage subsystem over a network such as an Internet Protocol (IP) network. The system includes client components and storage subsystem components. Client components include a walker that traverses the namespace looking for files that meet the criteria for optimization, a file system daemon that rehydrates the files, and a filter driver that watches all operations going to the file system. Storage subsystem components include an optimizer resident on the nodes of the storage subsystem. The optimizer can use idle processor cycles to perform optimization. Sub-file compression can be performed at the storage subsystem.

18 Claims, 8 Drawing Sheets

(56) References Cited

U.S. PATENT DOCUMENTS

| | | | | |
|---|---|---|---|---|
| 7,924,482 B2* | 4/2011 | Ogata | ............... | H04N 1/0057 358/400 |
| 7,970,965 B2* | 6/2011 | Kedem | ............. | G06F 3/0608 709/247 |
| 7,992,037 B2 | 8/2011 | Dubnicki et al. | | |
| 8,219,524 B2 | 7/2012 | Gokhale | | |
| 8,510,275 B2 | 8/2013 | Wilson et al. | | |
| 2004/0042547 A1* | 3/2004 | Coleman | ............ | H04N 19/507 375/240.01 |
| 2005/0138483 A1* | 6/2005 | Hatonen | ............ | G06F 11/3466 714/45 |
| 2006/0136365 A1* | 6/2006 | Kedem | ............. | G06F 3/0608 |
| 2007/0005911 A1* | 1/2007 | Yang | ................ | G06F 12/023 711/154 |
| 2007/0233707 A1 | 10/2007 | Osmond et al. | | |
| 2008/0005201 A1* | 1/2008 | Ting et al. | ................ | 707/204 |
| 2008/0025298 A1* | 1/2008 | Lev-Ran | .............. | H04L 69/04 370/389 |
| 2008/0034119 A1* | 2/2008 | Verzunov | ............. | H04L 69/04 709/247 |
| 2008/0046616 A1* | 2/2008 | Verzunov | ........... | H04L 63/0272 710/68 |
| 2008/0294660 A1 | 11/2008 | Patterson et al. | | |
| 2009/0049260 A1 | 2/2009 | Upadhyayula | | |
| 2009/0234870 A1 | 9/2009 | Bates et al. | | |
| 2009/0268903 A1* | 10/2009 | Bojinov et al. | ............. | 380/45 |
| 2009/0307249 A1* | 12/2009 | Koifman | ............ | G06F 3/0623 |
| 2009/0313248 A1 | 12/2009 | Balachandran et al. | | |
| 2009/0327625 A1 | 12/2009 | Jaquette et al. | | |
| 2010/0029497 A1 | 2/2010 | Himmler et al. | | |
| 2010/0058013 A1* | 3/2010 | Gelson | ............. | G06F 11/1453 711/162 |
| 2010/0088296 A1 | 4/2010 | Periyagaram et al. | | |
| 2010/0125553 A1* | 5/2010 | Huang et al. | ............. | 707/661 |
| 2010/0161608 A1 | 6/2010 | Jain et al. | | |
| 2010/0191783 A1* | 7/2010 | Mason | ............. | G06F 17/30088 707/822 |
| 2010/0228800 A1* | 9/2010 | Aston | ............... | G06F 17/30153 707/822 |
| 2010/0250896 A1 | 9/2010 | Matze | | |
| 2010/0274772 A1* | 10/2010 | Samuels | ........... | G06F 17/30233 707/693 |
| 2010/0312800 A1* | 12/2010 | Lumb | ........... | 707/796 |
| 2010/0313036 A1 | 12/2010 | Lumb | | |
| 2010/0313040 A1* | 12/2010 | Lumb | .......... | 713/193 |
| 2011/0029497 A1 | 2/2011 | Benhase et al. | | |
| 2011/0093471 A1 | 4/2011 | Brockway et al. | | |
| 2011/0218974 A1* | 9/2011 | Amit | ....... | G06F 17/30 707/693 |

OTHER PUBLICATIONS

"An In-Depth Look at Data Deduplication Methods", E-Guide, SearchDataBackup.com, TechTarget, Apr. 2009, 10 pgs.

"U.S. Appl. No. 12/858,258, Advisory Action mailed Aug. 24, 2012", 3 pgs.

"U.S. Appl. No. 12/858,258, Final Office Action mailed Jun. 8, 2012", 16 pgs.

"U.S. Appl. No. 12/858,258, Non Final Office Action mailed Jan. 30, 2012", 10 pgs.

"U.S. Appl. No. 12/858,258, Notice of Allowance mailed Apr. 8, 2013", 13 pgs.

"Integrating HP Data Protector Software with HP Data Deduplication Solutions", HP, White Paper, 2008, 10 pgs.

Meyer, Dutch T., "A Study of Practical Deduplication", Microsoft Research and The University of British Columbia, [Online]. Retrieved from the Internet: < http://static.usenix.org/event/fast11/tech/full_papers/Meyer.pdf >, 13 pgs.

\* cited by examiner

| Data A | Data B | Data C | File X 101 |

| Data D | Data B | Data C | File Y 103 |

| Data D | Data B | Data E | File Z 105 |

| Filemap File X 201 | | |
|---|---|---|
| Offset 203 | Index 205 | Lname 207 |
| 0K | 0.1 | NULL |
| 8K | 0.2 | NULL |
| 16K | 0.3 | NULL |

Figure 2B

| Datastore Suitcase 271 | | |
|---|---|---|
| Data Table 251 | | |
| Index 253 | Data Offset 255 | Data Reference Count 257 |
| 1 | Offset-Data A | 1 |
| 2 | Offset-Data B | 1 |
| 3 | Offset-Data C | 1 |
| Datastore | | |
| | Data 261 | Last File 263 |
| 1 | Data A | File X 201 |
| 2 | Data B | File X 201 |
| 3 | Data C | File X 201 |

Figure 3A

| Filemap File X 301 | | |
|---|---|---|
| Offset 303 | Index 305 | Lname 307 |
| 0K | 0.1 | NULL |
| 8K | 0.2 | NULL |
| 16K | 0.3 | NULL |

| Filemap File Y 311 | | |
|---|---|---|
| Offset 313 | Index 315 | Lname 317 |
| 0K | 0.4 | NULL |
| 8K | 0.2 | File X 301 |
| 16K | 0.3 | File X 301 |

Figure 3B

| Datastore Suitcase 371 | | |
|---|---|---|
| | Data Table 351 | |
| Index 353 | Data Offset 355 | Data Reference Count 357 |
| 1 | Offset-Data A | 1 |
| 2 | Offset-Data B | 2 |
| 3 | Offset-Data C | 2 |
| 4 | Offset-Data D | 1 |
| | Datastore | |
| | Data 361 | Last File 363 |
| 1 | Data A | File X 301 |
| 2 | Data B | File Y 311 |
| 3 | Data C | File Y 311 |
| 4 | Data D | File Y 311 |

Figure 4A

| Filemap File X 401 | | |
|---|---|---|
| Offset 403 | Index 405 | Lname 407 |
| 0K | 0.1 | NULL |
| 8K | 0.2 | NULL |
| 16K | 0.3 | NULL |

| Filemap File Y 411 | | |
|---|---|---|
| Offset 413 | Index 415 | Lname 417 |
| 0K | 0.4 | NULL |
| 8K | 0.2 | File X 401 |
| 16K | 0.3 | File X 401 |

| Filemap File Z 421 | | |
|---|---|---|
| Offset 423 | Index 425 | Lname 427 |
| 0K | 0.4 | File Y 411 |
| 8K | 0.2 | File Y 411 |
| 16K | 0.5 | NULL |

Figure 4B

| Datastore Suitcase 471 | | |
|---|---|---|
| | Data Table 451 | |
| Index 453 | Data Offset 455 | Data Reference Count 457 |
| 1 | Offset-Data A | 1 |
| 2 | Offset-Data B | 3 |
| 3 | Offset-Data C | 2 |
| 4 | Offset-Data D | 2 |
| 5 | Offset-Data E | 1 |
| | Datastore | |
| | Data 461 | Last File 463 |
| 1 | Data A | File X 401 |
| 2 | Data B | File Z 421 |
| 3 | Data C | File Y 411 |
| 4 | Data D | File Z 421 |
| 5 | Data E | File Z 421 |

FILE AWARE BLOCK LEVEL DEDUPLICATION

CROSS-REFERENCE TO RELATED APPLICATION

The present application claims benefit under 35 U.S.C. 120 to U.S. application Ser. No. 12/858,258 filed Aug. 17, 2010, titled "FILE AWARE BLOCK LEVEL DEDUPLICATION", which claims priority under 35 U.S.C. 119(e) to U.S. Provisional Application No. 61/244,398 filed Sep. 21, 2009, titled "FILE AWARE BLOCK LEVEL DEDUPLICATION," both of which are incorporated herein by this reference for all purposes.

TECHNICAL FIELD

The present disclosure relates to incorporating file aware data compression and deduplication into block based storage systems.

DESCRIPTION OF RELATED ART

Maintaining vast amounts of data is resource intensive not just in terms of the physical hardware costs but also in terms of system administration and infrastructure costs. Some mechanisms allow compression of data to save on resources. For example, some file formats such as the Portable Document Format (PDF) are compressed. Some other utilities allow compression on an individual file level in a relatively inefficient manner.

Data deduplication refers to the ability of a system to eliminate data duplication across files to increase storage, transmission, and/or processing efficiency. A storage system which incorporates deduplication technology involves storing a single instance of a data segment that is common across multiple files and/or users. In some examples, data sent to a storage system is segmented in fixed or variable sized segments. Each segment is provided with a segment identifier (ID), such as a digital signature or the actual data. Once the segment ID is generated, it can be used to determine if the data segment already exists in the system. If the data segment does exist, it need not be stored again. The reference count for the single instance data segment is incremented and some form of file mapping construct is used to associate the deduplicated segment from a particular file to the single instance stored in the storage system.

However, mechanisms for determining commonality in a deduplicated data set are limited. Consequently, mechanisms are provided for improving the ability to determine commonality in a deduplicated data set.

BRIEF DESCRIPTION OF THE DRAWINGS

The disclosure may best be understood by reference to the following description taken in conjunction with the accompanying drawings, which illustrate particular embodiments of the present invention.

FIG. 1 illustrates a particular example of files and data segments.

FIG. 2A illustrates a particular example of a filemap.

FIG. 2B illustrates a particular example of a datastore suitcase.

FIG. 3A illustrates a particular example of a filemap.

FIG. 3B illustrates a particular example of a datastore suitcase.

FIG. 4A illustrates another example of a filemap.

FIG. 4B illustrates another example of a datastore suitcase.

DESCRIPTION OF PARTICULAR EMBODIMENTS

Figure 5:
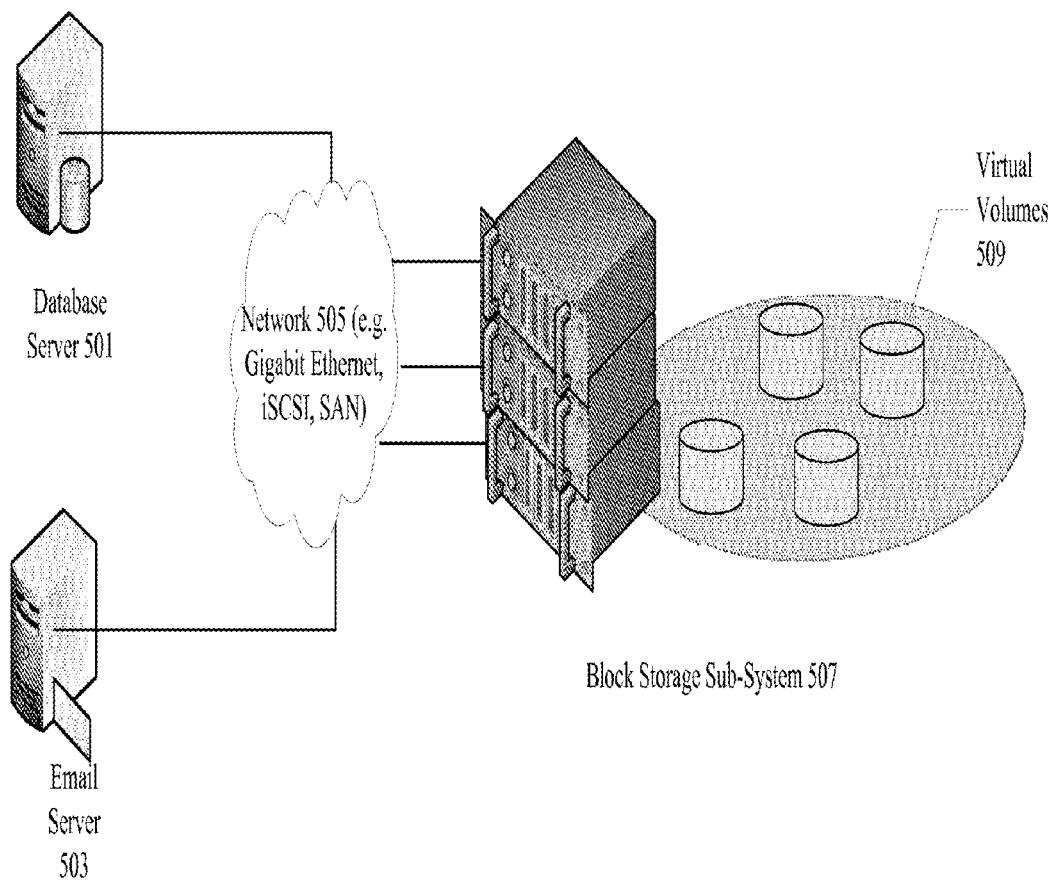
FIG. 5 illustrates a technique for modifying a datastore suitcase.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques and mechanisms of the present invention will be described in the context of particular types of data. However, it should be noted that the techniques and mechanisms of the present invention apply to a variety of different types of data and data formats. In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

A system provides file aware block level deduplication in a system having multiple clients connected to a storage subsystem over a network such as an Internet Protocol (IP) network. The system includes client components and storage subsystem components. Client components include a walker that traverses the namespace looking for files that meet the criteria for optimization, a file system daemon that rehydrates the files, and a filter driver that watches all operations going to the file system. Storage subsystem components include an optimizer resident on the nodes of the storage subsystem. The optimizer can use idle processor cycles to perform optimization. Sub-file compression can be performed at the storage subsystem.

Example Embodiments

Maintaining, managing, transmitting, and/or processing large amounts of data can have significant costs. These costs include not only power and cooling costs but system maintenance, network bandwidth, and hardware costs as well.

Some efforts have been made to reduce the footprint of data maintained by file servers. A variety of utilities compress files on an individual basis prior to writing data to file servers. Although individual file compression can be effective, it often provides inefficient compression. Decompression is also not particularly efficient. Other mechanisms include data deduplication. In a file server system, deduplication is hidden from users and applications. Data deduplication reduces storage footprints by reducing the amount of redundant data.

According to various embodiments, an optimization tool can aggressively compress and deduplicate files based on characteristics of particular files and file types as well as based on characteristics across multiple files. According to various embodiments, any processed file that may be smaller, more efficiently read and transmitted, and/or more effectively stored than a non-processed file is referred to herein as an optimized file. Any individual file or portion of the individual file that is processed to increase the storage efficiency of the file is referred to herein as a compressed file. Any file associated with a group of files that are processed to increase the storage efficiency of the group of files is referred to herein as a deduplicated file. That is, instead of simply optimizing a single file, multiple files can be optimized efficiently. It should be noted that a deduplicated file is not necessarily compressed and a compressed filed is not necessarily deduplicated, but an optimized file can be compressed and/or deduplicated.

Optimization may involve identifying variable or fixed sized segments. According to various embodiments, each segment of data is processed using a hash algorithm such as MD5 or SHA-1. This process generates a unique ID, hash, or reference for each segment. That is, if only a few bytes of a document or presentation are changed, only changed portions are saved. In some instances, deduplication searches for matching sequences using a fixed or sliding window and uses references to matching sequences instead of storing the matching sequences again.

According to various embodiments, deduplication systems include dictionaries, filemap suitcases, and datastore suitcases. A dictionary is a file that contains the segment identifiers and location pairs. The segment identifiers can be created by using an MD5, SHA or other mechanism for creating a unique ID for a data segment. Since the dictionary can grow into a large file (>1 TB) it must be organized in a way that makes it readily searchable. Organizing the identifier location pairs in a binary tree is one approach which can be used to accelerate searches. Each optimizer node in the cluster can have its own dictionary.

In particular embodiments, filemap suitcases are regular files which hold filemaps for deduplicated files. Filemaps are used to reference all data segments for the associated file whether the segments are common to other files or unique. A datastore suitcase holds the actual data segments for the deduplicated files. Each data segment has a reference count associated with it. The reference count specifies the number of filemap entries which are referencing the data segment. When the reference count is zero, a cleaner application can delete the entry from the suitcase. It should be noted that the metadata is grouped together before the data segments. By grouping the metadata together, a single sequential read can bring in all of the metadata. Once all of the metadata is memory resident, parallel reads and decompression of multiple data segments can be scheduled. Reading and decompressing the data segments in parallel can significantly increase read performance on multi-core and clustered machines. The Datastore suitcase header includes the length and offset of the metadata. The header also includes the location of the next available offset for additional metadata entries.

With the dictionary, filemap suitcases and datastore suitcases, a file system independent layout for storing and referencing deduplicated data can be implemented.

Various implementations of data reduction solutions are deployed on the storage system itself, as an in-band appliance, or as an out of band appliance that sits on the side of the storage. A solution on the storage system performs block level deduplication and compression without being file aware. This solution has no notion of the files that the blocks are associated with. Consequently, file specific compressors can not be used and ideal segment boundaries can not be identified. Another solution is an in-band appliance that sits between the clients and the storage system. In-band appliances are limited to what can be done quickly in-line and are only done on a file by file basis without the benefit of a global data view. In-band appliances also require new hardware to be added to a configuration. Out of band appliances sit on the side of the storage system, read in data, optimize it, and write out optimized data. Out of band appliances have the benefit of taking a global data reduction view and can use more time optimizing each file. However, this approach requires new hardware in the configuration and does not take advantage of spare processing cycles on the storage subsystem.

Consequently, the techniques and mechanisms of the present invention provide a file aware block optimization solution. According to various embodiments, the file aware block optimization solution includes a walker, a file system daemon, a filter driver and an optimizer. In particular embodiments, the walker is a client component that traverses the namespace looking for files that meet the criteria for optimization. The walker uses a file system created on the block storage that the client has mounted. According to various embodiments, the file system daemon is a client component that rehydrates files. The filter driver is a client component that will watch all operations which are going to the file system and take the appropriate action based on whether a file is optimized or not. An optimizer is a component that is resident on the nodes of the storage subsystem and can use CPU cycles of an idle controller to perform optimization. A suitcase volume is a volume used to keep the suitcase data. This volume can be implemented as either a raw device or a file system.

To perform optimization, the walker finds candidate files by traversing the file system or by receiving file change notifications. After identifying the candidate files, a special interface is used between the walker and the storage-sub system to identify the blocks for the files. According to various embodiments, a scatter gather block list, file list, and volumes are sent to the storage sub-system for optimization. Special tokens unique for the instance of each file can also be sent in the message. In particular embodiments, an optimizer running within a storage node takes the block lists, reads in the candidate blocks, deduplicates and compresses the blocks and stores the optimized data in a suitcase volume.

According to various embodiments, after the block list has been optimized, the optimizer via a remote procedure call (RPC) will notify the client that the files have been optimized and are stored within suitcases. The RPC will include the necessary information to find the optimized data in the suitcase volume and the file tokens. In particular embodiments, the walker upon receipt of the optimization complete message will use the tokens to verify that the files have not changed. If any file has changed during the optimization process, the file will not be turned into a stub file. If the file has not been changed, a stub file which includes the filemap needed to find the optimized data on reads is created. The walker then sends a message to the storage sub-system specifying the file blocks that can be returned to the free space pool.

To perform a file read, the filter driver recognizes that a file read operation is going to a file stub. According to various embodiments, the filter driver sends the file request along with the filemap to the file system daemon. In particular embodiments, the file system daemon reads in the optimized data from the suitcase volume, rehydrates it, and services the request. The stub file will contain all of the original metadata included in the regular file, so attribute requests can be serviced directly from the stub file without going to the suitcase for additional information.

To perform a write, the filter driver recognizes that a file write operation is directed at an optimized file. The write proceeds to a newly allocated region in the suitcase. According to various embodiments, the filemap for the stub file is updated to include the new region. The region that holds the previous data is freed.

Files such as an exchange database can be very large and it is often not feasible to optimize them in a single pass. Therefore, sections of large files can be optimized and partial file optimization can be performed. The original file will have a sparse filemap. To service a read request, the file server daemon will first check the filemap associated with the file to see if a section of the file has been optimized. If a section has been optimized, the file server daemon will obtain the data from a suitcase. Otherwise, the filter server daemon will obtain the data directly from the original blocks of the file.

Additionally, since the filter driver sees all I/O operations to the file system, it can keep track of what regions of a file are being accessed frequently (hot regions) and only optimize the regions that have not been accessed over a given time period (cold regions). Typical mechanisms optimize based on file attributes such as access or modification time, but these attributes are for the whole file and not regions of the file. The techniques and mechanisms of the present invention's use of a sparse filemap and the file server daemon's ability to use a sparse map facilitates file region aware optimization. Cold regions can be efficiently optimized while hot region remain non-optimized.

A file aware block level deduplication system has a variety of benefits. For example, if the storage sub-system shares a global pool, the freed blocks are returned to the pool. Thus Client A can benefit from files being optimized on Client B because the free blocks are back in the pool and can be allocated to Client A.

Being file aware also allows the walker to present the block list to the optimizer in file read order. Not all files are stored in the order which they are read. Some applications will do many seeks within a file to read the data. When re-storing the data in optimized suitcases, the data will be stored in an application aware optimal order for read backs.

Direct integration with the storage subsystem also makes it easy to free blocks since holes can be punched in files and suitcases. This means that files do not have to be re-written to reclaim space. Furthermore, architecture is distributed and scales as more storage nodes or clients are added.

FIG. 1 illustrates examples of files and data segments. According to various embodiments, file X 101 includes data A, data B, and data C. File Y 103 includes data D, data B, and data C. File Z 105 includes data D, data B, and data E. According to various embodiments, each data segment is 8K in size. The three files include five different segments A, B, C, D, and E. Files X 101, Y 103, and Z 105 can be deduplicated to remove redundancy in storing the different segments. For example, data B need only be stored once instead of three times. Data C and data D need only be stored once instead of twice. The techniques and mechanisms of the present invention recognize that common segments are determined during deduplication. Commonality characteristics and information can be maintained to allow efficient determination of segment commonality after deduplication.

FIG. 2A illustrates one example of a filemap and FIG. 2B illustrates a corresponding datastore suitcase created after optimizing a file X. Filemap file X 201 includes offset 203, index 205, and lname 207 fields. According to various embodiments, each segment in the filemap for file X is 8K in size. In particular embodiments, each data segment has an index of format <Datastore Suitcase ID>. <Data Table Index>. For example, 0.1 corresponds to suitcase ID 0 and datatable index 1, while 2.3 corresponds to suitcase ID 2 and database index 3. The segments corresponding to offsets 0K, 8K, and 16K all reside in suitcase ID 0 while the data table indices are 1, 2, and 3. The lname field 207 is NULL in the filemap because each segment has not previously been referenced by any file.

FIG. 2B illustrates one example of a datastore suitcase corresponding to the filemap file X 201. According to various embodiments, datastore suitcase 271 includes an index portion and a data portion. The index section includes indices 253, data offsets 255, and data reference counts 257. The data section includes indices 253, data 261, and last file references 263. According to various embodiments, arranging a data table 251 in this manner allows a system to perform a bulk read of the index portion to obtain offset data to allow parallel reads of large amounts of data in the data section. According to various embodiments, datastore suitcase 251 includes three offset, reference count pairs which map to the data segments of the filemap file X 201. In the index portion, index 1 corresponding to data in offset-data A has been referenced once. Index 2 corresponding to data in offset-data B has been referenced once. Index 3 corresponding to data in offset-data C has been referenced once. In the data portion, index 1 includes data A and a reference to File X 201 which was last to place a reference on the data A. Index 2 includes data B and a reference to File X 201 which was last to place a reference on the data B. Index 3 includes data C and a reference to File X 201 which was last to place a reference on the data C.

FIG. 3A illustrates file maps for two different files. Filemap file X 301 includes offset 303, index 305, and lname 307 fields. According to various embodiments, each segment in the filemap for file X is 8K in size. The segments corresponding to offsets 0K, 8K, and 16K all reside in suitcase ID 0 while the data table indices 1, 2, and 3. The lname field 207 is NULL in the filemap because each segment has not previously been referenced by any file.

Filemap file Y 311 includes offset 313, index 315, and lname 317 fields. According to various embodiments, each segment in the filemap for file X is 8K in size. The segments corresponding to offsets 0K, 8K, and 16K all reside in suitcase ID 0 while the data table indices include 4, 2, and 3. The lname field 317 is NULL in the filemap for offset 0K corresponding to index 0.4 because the segment has not previously been referenced by any file. However, the lname field 317 for offsets 8K and 16K corresponding to indices 0.2 and 0.3 have been referenced before by file X 301.

FIG. 3B illustrates one example of a datastore suitcase for file X 301 and file Y 311. According to various embodiments, datastore suitcase 371 includes an index portion and a data portion. The index section includes indices 353, data offsets 355, and data reference counts 357. The data section includes indices 353, data 361, and last file references 363. According to various embodiments, arranging a data table 351 in this manner allows a system to perform a bulk read of the index portion to obtain offset data to allow parallel reads of large amounts of data in the data section.

Index 0.1 corresponding to Data A is referenced by only file X 301. The reference count remains set at 1 and the last file 363 remains file X 301. Index 0.2 corresponding to Data B is referenced by file Y 311. The reference count is incremented to two and the last file field 363 is set to file Y 311. Index 0.3 corresponding to Data C is referenced by file X 301 and by file Y 303. The reference count remains set at 1 and the last file 363 remains file Y 303. Index 0.4 corresponding to Data D is reference by file Y 311. The reference count is set to 1 and the last file 363 field is set to file Y 311.

According to various embodiments, since only the 1st data segment in file Y 311 is different from file X 301, only one additional entry for segment Data D is added to the Data Table 351. The reference counts for Data B and Data C are incremented since these data segments are common to file X 301 and file Y 311. Additionally, the lnames in the datastore suitcase for the last reference of Data C and Data B are changed to file Y 311. The last file reference for Data A remains file X 301 because Data A is not in file Y 311. Prior to overwriting the lnames in the Datastore, they are captured in the filemap of file Y 311.

FIG. 4A illustrates file maps for three different files. Filemap file X 401 includes offset 403, index 405, and lname 407 fields. According to various embodiments, each segment in the filemap for file X is 8K in size. The segments corresponding to offsets 0K, 8K, and 16K all reside in suitcase ID 0 while the data table indices 1, 2, and 3. The lname field 207 is NULL in the filemap because each segment has not previously been referenced by any file.

Filemap file Y 411 includes offset 413, index 415, and lname 417 fields. According to various embodiments, each segment in the filemap for file Y is 8K in size. The segments corresponding to offsets 0K, 8K, and 16K all reside in suitcase ID 0 while the data table indices include 4, 2, and 3. The lname field 417 is NULL in the filemap for offset 0K corresponding to index 0.4 because the segment has not previously been referenced by any file. However, the lname field 417 for offsets 8K and 16K corresponding to indices 0.2 and 0.3 have been referenced before by file X 401.

Filemap file Z 421 includes offset 423, index 425, and lname 427 fields. According to various embodiments, each segment in the filemap for file Z is 8K in size. The segments corresponding to offsets 0K, 8K, and 16K all reside in suitcase ID 0 while the data table indices include 4, 2, and 5. The lname field 427 is NULL in the filemap for offset 16K corresponding to index 0.5 because the segment has not previously been referenced by any file. However, the lname field 427 for offsets 0K and 8K corresponding to indices 0.4 and 0.2 have been referenced before by file Y 411.

FIG. 4B illustrates one example of a datastore suitcase for file X 401, file Y 411, and file Z 421. According to various embodiments, datastore suitcase 471 includes an index portion and a data portion. The index section includes indices 453, data offsets 455, and data reference counts 457. The data section includes indices 453, data 461, and last file references 463. According to various embodiments, arranging a data table 451 in this manner allows a system to perform a bulk read of the index portion to obtain offset data to allow parallel reads of large amounts of data in the data section.

Index 0.1 corresponding to Data A is referenced only by file X 401. The reference count remains set at 1 and the last file 463 remains set to file X 401. Index 0.2 corresponding to Data B is referenced by all three files 401, 411, and 421 and consequently has a reference count incremented to three and a last file 463 field set to file Z 421. Index 0.3 corresponding to Data C is reference by two files, file X 401 and file Y 411. The reference count remains set at two and the last file 463 field remains set to file Y 411. Index 0.4 corresponding to Data D is reference by two files, file Y 411 and file Z 421. The reference count is incremented to two and the last file 463 field is set to file Z 421. Index 0.5 corresponding to Data E is referenced only by file Z 421. The reference count is set to one and the last file 463 field is set to file Z 421.

According to various embodiments, since only the 1st data segment in file Z 411 is different from the segments in file X 401 and file Y 411, only one additional entry for segment Data E is added to the Data Table 451. The reference counts for Data B and Data D are incremented since these data segments are common to file X 401 and file Y 411. Additionally, the lnames in the datastore suitcase for the last reference of Data B and Data D are changed to file Z 421. The last file reference for Data A remains file X 401 because Data A is not in file Z 421. The last file reference for Data C remains file Y 411 because Data C is not in file Z 421. Prior to overwriting the lnames in the datastore 471, they are captured in the filemap of file Z 421.

FIG. 5 illustrates one example of a configuration providing clients with access to storage over a network such as an IP network. According to various embodiments, database server 501 and email server 503 are connected to a block storage sub-system 507 over a network such as a gigabit Ethernet, iSCSI, or storage area network. The block storage sub-system 507 includes virtual volumes 509 maintaining data segments for database server 501 and email server 503. According to various embodiments, clients on database server 501 and email server 503 can file systems on the block storage sub-system that the clients have mounted.

Figure 6:
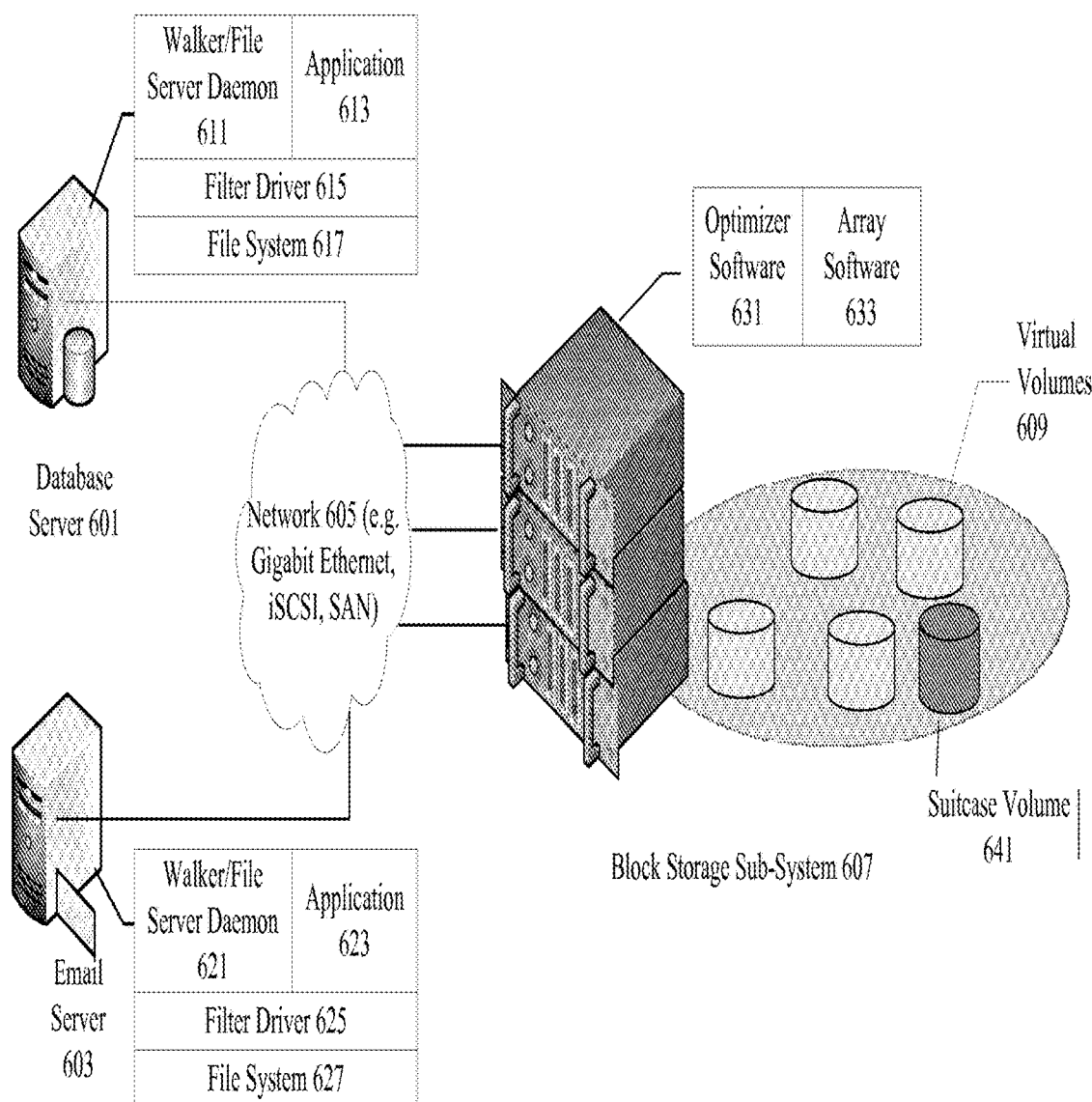
FIG. 6 illustrates a technique for identifying files that reference a particular data segment.

FIG. 6 illustrates components of a file aware block level optimization system. According to various embodiments, database server 601 and email server 603 are connected to a block storage sub-system 607 over a network such as a Gigabit Ethernet, iSCSI, or storage area network. The block storage sub-system 607 includes virtual volumes 609 maintaining data segments for database server 601 and email server 603. According to various embodiments, clients on database server 601 and email server 603 can file systems on the block storage sub-system that the clients have mounted.

According to various embodiments, a database server 601 includes a walker/file server daemon 611, an application 613, a filter driver 615, and a file system 617. In particular embodiments, the walker 611 is a component that traverses the namespace associated with the file system 617 looking for files that meet the criteria for optimization. Criteria may include file type, file size, and file activity frequency. The walker 611 uses a file system 617 created on the block storage that the client has mounted. According to various embodiments, the file system daemon portion of the walker 611 rehydrates files. In particular embodiments, the filter driver 615 is a client component that will watch all operations which are going to the file system 617 and take the appropriate action based on whether a file is optimized or not.

According to various embodiments, an email server 603 includes a walker/file server daemon 621, an application 623, a filter driver 625, and a file system 627. In particular embodiments, the walker 621 is a component that traverses the namespace associated with the file system 627 looking for files that meet the criteria for optimization. Criteria may include file type, file size, and file activity frequency. The walker 621 uses a file system 627 created on the block storage that the client has mounted. According to various embodiments, the file system daemon portion of the walker 621 rehydrates files. In particular embodiments, the filter driver 625 is a client component that will watch all operations which are going to the file system 627 and take the appropriate action based on whether a file is optimized or not.

According to various embodiments, to perform optimization, the walker 621 finds candidate files by traversing the file system 627 or by receiving file change notifications. After identifying the candidate files, an interface is used between the walker 621 and the storage-sub system 607 to identify the blocks for the files. According to various embodiments, a scatter gather block list, file list, and volumes are sent to the storage sub-system 607 for optimization. Special tokens unique for the instance of each file can also be sent in the message. In particular embodiments, an optimizer 631 running within a storage node takes the block lists, reads in the candidate blocks, deduplicates and compresses the blocks and stores the optimized data in a suitcase volume 641.

Figure 7:
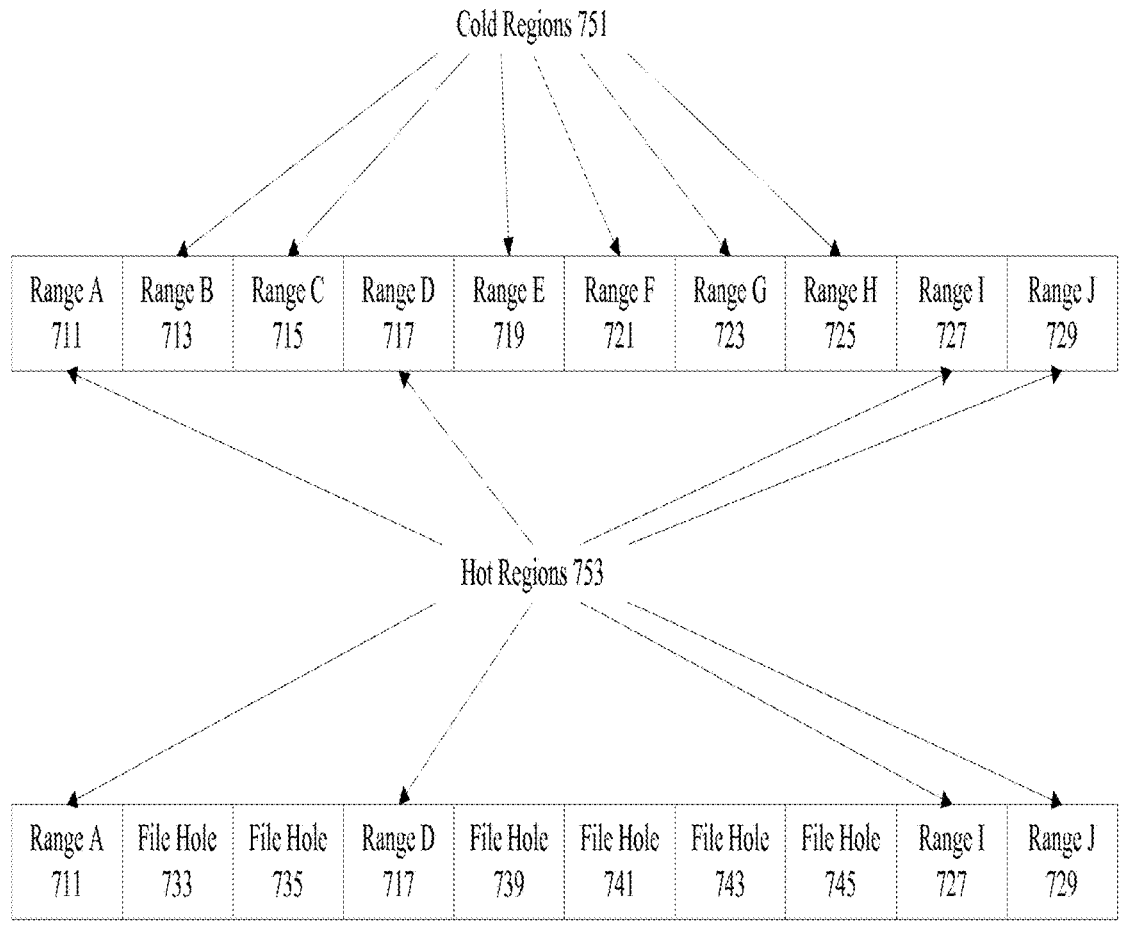
FIG. 7 illustrates a mechanism for identifying files that share common data with a particular file.

FIG. 7 illustrates one example of sub-file optimization. The techniques of the present invention recognize that different portions of a file may be associated with different activity levels. In particular embodiments, file portions that are frequently accessed or require fast response times are referred to herein as hot portions of a file. Hot portions of a file are left as is without optimization. Although optimization saves resources in a variety of ways, access of optimized data does require some overhead, and hot portions based on some access threshold are left non-optimized to preserve system efficiency. No filemap lookup or datastore suitcase access and retrieval is necessary. By contrast, there may be other portions of a file that are infrequently accessed or are non-critical to system operation. These portions are referred to herein as cold portions of a file. Cold portions of a file are optimized using compressions and/or deduplication to save resources. FIG. 7 shows one example of a file aware optimization.

According to various embodiments, a file includes Range A 711, Range B 713, Range C 715, Range D 717, Range E 719, Range F 721, Range G 723, Range H 725, Range I 727, and Range J 729. In particular embodiments, a system identifies activity levels of various portions of a file and can subdivide a file based on activity level indices or heat indices. Whether a portion is determined to be hot or cold may depend on a access frequency threshold. In some examples, if a portion has not been accessed within the last two days, the portion is determined to be cold and suitable for optimization. According to various embodiments, Range A 711, Range D 717, Range I 727, and Range J 729 are determined to be hot regions 753 while Range B 713, Range C 715, Range E 719, Range F 721, Range G 723, and Range H 725 are determined to be cold regions. A sparse file map 701 is generated to include only cold portions of a file. The file now has file holes 733, 735, 739, 741, 743, and 745. The sparse filemap 701 includes ranges and suitcase locations. In particular embodiments, Range B 713, Range C 715, Range E 719, Range F 721, Range G 723, and Range H 725 have corresponding suitcase locations 773, 775, 779, 781, 783, and 785. Efficiency of data access and response times for frequently accessed portions can be maintained while allowing resources savings for portions infrequently accessed.

Figure 8:
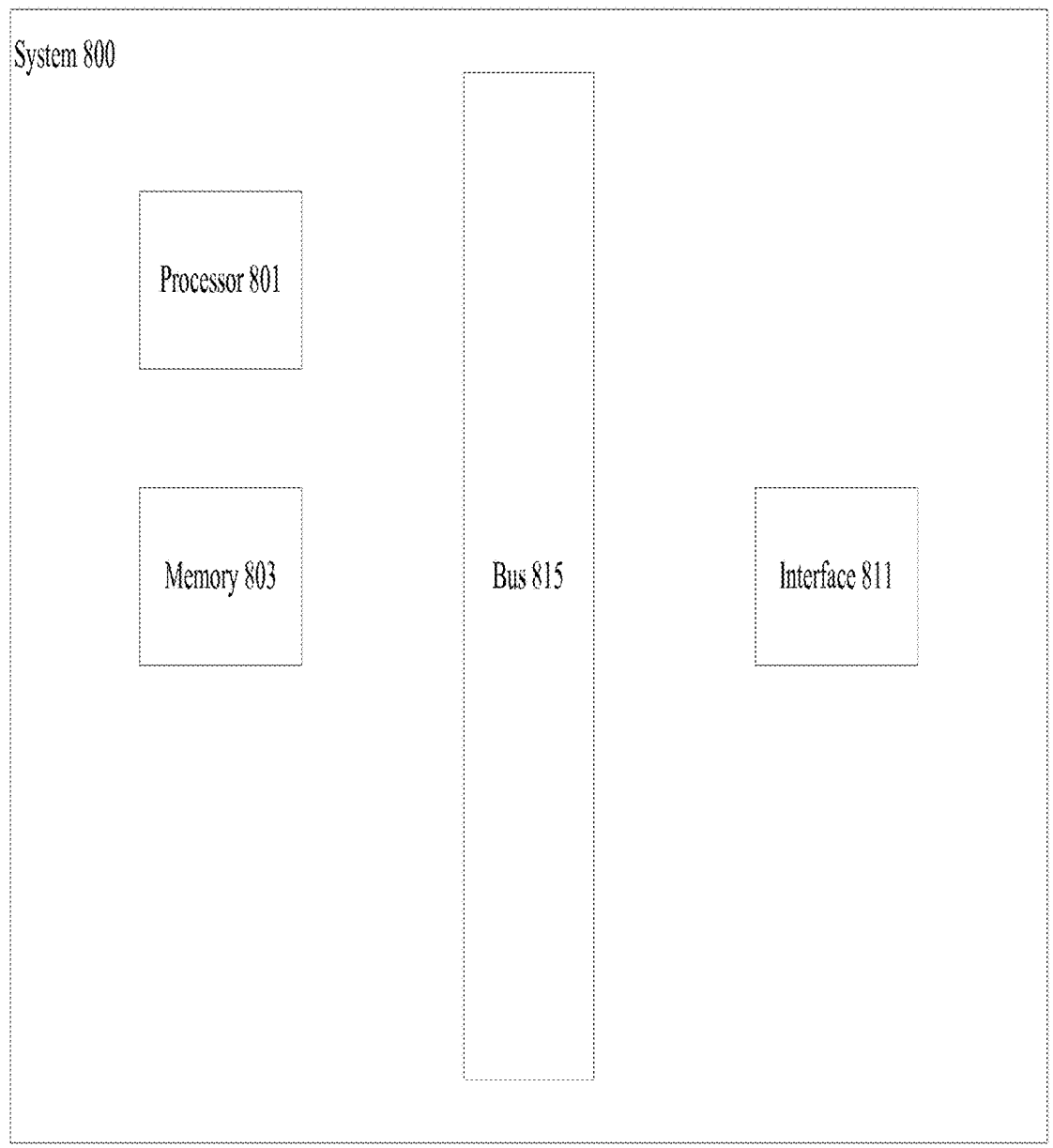
FIG. 8 illustrates a particular example of a computer system.

A variety of devices and applications can implement particular examples of commonality determination. FIG. 8 illustrates one example of a computer system. According to particular example embodiments, a system 800 suitable for implementing particular embodiments of the present invention includes a processor 801, a memory 803, an interface 811, and a bus 815 (e.g., a PCI bus). When acting under the control of appropriate software or firmware, the processor 801 is responsible for such tasks such as optimization. Various specially configured devices can also be used in place of a processor 801 or in addition to processor 801. The complete implementation can also be done in custom hardware. The interface 811 is typically configured to send and receive data packets or data segments over a network. Particular examples of interfaces the device supports include Ethernet interfaces, frame relay interfaces, cable interfaces, DSL interfaces, token ring interfaces, and the like.

In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to particular example embodiments, the system 800 uses memory 803 to store data and program instructions and maintained a local side cache. The program instructions may control the operation of an operating system and/or one or more applications, for example. The memory or memories may also be configured to store received metadata and batch requested metadata.

Because such information and program instructions may be employed to implement the systems/methods described herein, the present invention relates to tangible, machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

Although many of the components and processes are described above in the singular for convenience, it will be appreciated by one of skill in the art that multiple components and repeated processes can also be used to practice the techniques of the present invention.

While the invention has been particularly shown and described with reference to specific embodiments thereof, it will be understood by those skilled in the art that changes in the form and details of the disclosed embodiments may be made without departing from the spirit or scope of the invention. It is therefore intended that the invention be interpreted to include all variations and equivalents that fall within the true spirit and scope of the present invention.

What is claimed is:

1. A server comprising:
   a communications interface operable to transmit to a client device file system traversal information via a network and receive a message from the client device transmitted via the network, the message including a block list identifying a plurality of blocks in a plurality of candidate files, the block list identified based on a traversal of a file system at the server by the client machine;
   an optimizer component operable to optimize at least a portion of the plurality of blocks identified in the block list, wherein optimizing includes deduplication and compression operations, and wherein the optimizer produces optimized data; and
   a storage component operable to store at least a portion of the optimized data in a suitcase volume, wherein the communications interface is further operable to receive a request for file information corresponding with a file from a file system daemon and transmit optimized data corresponding with the requested file to the file system daemon in response to the request, the optimized data being retrieved from the suitcase volume, the file system daemon being configured to rehydrate the optimized data to create the requested file.

2. The server recited in claim 1, wherein the communications interface is further operable to transmit a notification message to the client device, the notification message indicating that the plurality of blocks have been processed by the optimizer.

3. The server recited in claim 2, wherein the notification message includes optimized data location information.

4. The server recited in claim 2, wherein the message further includes a plurality of tokens corresponding with the plurality of candidate files, and wherein the notification message includes a designated token, the designated token being one of the plurality of tokens.

5. The server recited in claim 4, wherein the designated token is configured to be used to determine whether a designated file in the plurality of candidate files has changed during optimization.

6. The server recited in claim 1, wherein the message identifies a designated plurality of file blocks, the designated plurality of file blocks capable of being returned to a free space pool.

7. The server recited in claim 1, wherein the suitcase volume includes a designated plurality of data blocks, the designated plurality of data blocks being associated with deduplicated files, each of the designated plurality of data blocks being associated with a reference count, the reference count identifying a number of filemap entries referenced by the data block.

8. The server recited in claim 1, wherein the plurality of candidate files are determined by a walker running on the client device, the walker being configured to traverse a namespace to search for one or more files that meet one or more criteria for optimization.

9. A method, comprising:
   transmitting to a client device file system traversal information via a network;
   receiving at a storage subsystem a message from the client device transmitted via the network, the message including a block list identifying a plurality of blocks in a plurality of candidate files, the block list identified based on a traversal of a file system at the server by the client machine;
   optimizing at least a portion of the plurality of blocks identified in the block list, wherein optimizing includes deduplication and compression operations, and wherein the optimizing produces optimized data;
   storing at least a portion of the optimized data in a suitcase volume; and
   receiving a request for file information corresponding with a file from a file system daemon and transmit optimized data corresponding with the requested file to the file system daemon in response to the request, the optimized data being retrieved from the suitcase volume, the file system daemon being configured to rehydrate the optimized data to create the requested file.

10. The method recited in claim 9, the method further comprising transmitting a notification message to the client device, the notification message indicating that the plurality of blocks have been processed by the optimizer.

11. The method recited in claim 10, wherein the notification message includes optimized data location information.

12. The method recited in claim 10, wherein the message further includes a plurality of tokens corresponding with the plurality of candidate files, and wherein the notification message includes a designated token, the designated token being one of the plurality of tokens.

13. The method recited in claim 12, wherein the designated token is configured to be used to determine whether a designated file in the plurality of candidate files has changed during optimization.

14. The method recited in claim 9, wherein the message identifies a designated plurality of file blocks, the designated plurality of file blocks capable of being returned to a free space pool.

15. The method recited in claim 9, wherein the suitcase volume includes a designated plurality of data blocks, the designated plurality of data blocks being associated with deduplicated files, each of the designated plurality of data blocks being associated with a reference count, the reference count identifying a number of filemap entries referenced by the data block.

16. The method recited in claim 9, wherein the plurality of candidate files are determined by a walker running on the client device, the walker being configured to traverse a namespace to search for one or more files that meet one or more criteria for optimization.

17. One or more non-transitory computer readable media having instructions stored thereon for performing a method, the method comprising:
   transmitting to a client device file system traversal information via a network;
   receiving at a storage subsystem a message from the client device transmitted via the network, the message including a block list identifying a plurality of blocks in a plurality of candidate files, the block list identified based on a traversal of a file system at the server by the client machine;

optimizing at least a portion of the plurality of blocks identified in the block list, wherein optimizing includes deduplication and compression operations, and wherein the optimizing produces optimized data; and storing at least a portion of the optimized data in a suitcase volume, wherein the communications interface is further operable to receive a request for file information corresponding with a file from a file system daemon and transmit optimized data corresponding with the requested file to the file system daemon in response to the request, the optimized data being retrieved from the suitcase volume, the file system daemon being configured to rehydrate the optimized data to create the requested file.

18. The one or more computer readable media recited in claim 17, the method further comprising transmitting a notification message to the client device, the notification message indicating that the plurality of blocks have been processed by the optimizer.

* * * * *